W. J. VINCENT.
TIRE.
APPLICATION FILED SEPT. 18, 1917.
1,303,995.
Patented May 20, 1919.
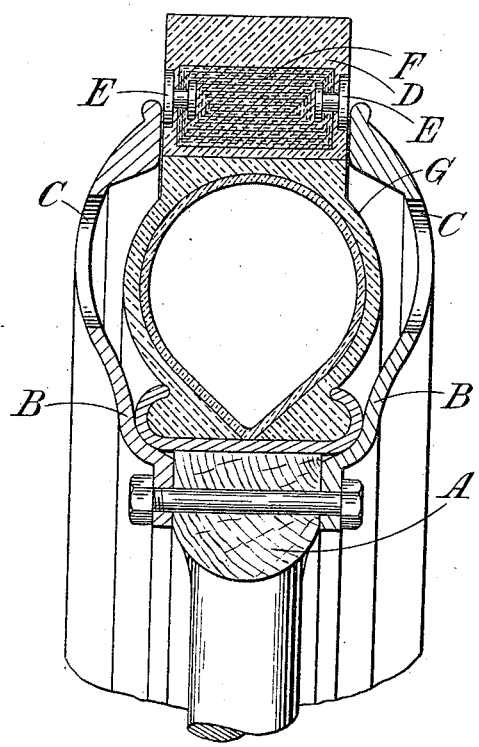

UNITED STATES PATENT OFFICE.

WILLIAM JOHN VINCENT, OF CARDIFF, WALES.

TIRE.

1,303,995. Specification of Letters Patent. Patented May 20, 1919.

Application filed September 18, 1917. Serial No. 191,991.

*To all whom it may concern:*

Be it known that I, WILLIAM JOHN VINCENT, a subject of the King of England, residing in Cardiff, Wales, Great Britain, have invented certain new and useful Improvements in Tires, of which the following is a specification.

This invention relates to vehicle wheels and tires, of the kind in which a pneumatic tube or tire is surrounded by a wear-resisting band, the pneumatic portion being inclosed by guides connected to the felly and extending on each side of the tread band to prevent lateral displacement of the latter.

According to this invention, metal studs are provided at the sides of the band opposite the guides to resist wear against the guides.

A construction is illustrated in the accompanying drawing in transverse section through the peripheral portion of a wheel.

Referring to the drawings, A is the felly, and B are guides bolted thereto and provided with holes C to reduce weight. D is a tread band with studs E, and stiffened on its inner circumferential portion with fabric F while the tread portion is formed of rubber. The studs E are placed so as to resist wear on the guides B. G is a tire comprising a pneumatic tube and a cover formed with a flattened periphery to receive the tread band.

What I claim as my invention and desire to secure by Letters Patent is:—

In a vehicle wheel, the combination with a hub and spokes, of a rim, a tire provided with a flat circumferential face, a pneumatic tube inclosed by said tire, means for holding the latter in place on the rim, a tread band stiffened near its inner circumference by fabric and fitted to the flat circumferential face of the tire, perforated guides mounted on said rim and having portions bearing against the sides of said tread band, and metal studs provided in the sides of the said tread band forming a wearing surface for the guiding portions of the said guides.

In testimony whereof I have signed my name to this specification in the presence of two subscribing witnesses.

WILLIAM JOHN VINCENT.

Witnesses:
C. A. HILYMAN,
LORIN A. LATHROP.

Copies of this patent may be obtained for five cents each, by addressing the "Commissioner of Patents, Washington, D. C."